(12) United States Patent
Vassilieva et al.

(10) Patent No.: US 7,693,425 B2
(45) Date of Patent: Apr. 6, 2010

(54) METHOD AND SYSTEM FOR COMPENSATING FOR OPTICAL DISPERSION IN AN OPTICAL SIGNAL IN A HYBRID OPTICAL NETWORK

(75) Inventors: Olga I. Vassilieva, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 11/622,181

(22) Filed: Jan. 11, 2007

(65) Prior Publication Data
US 2008/0170861 A1 Jul. 17, 2008

(51) Int. Cl.
*H04B 10/12* (2006.01)
(52) U.S. Cl. .................. 398/147; 398/149; 398/158; 398/159; 398/81; 385/24; 385/37
(58) Field of Classification Search ............ 398/79, 398/81, 83, 147, 148, 149, 158, 159, 183, 398/192, 193, 194, 208, 214; 385/24, 37
See application file for complete search history.

(56) References Cited

U.S. PATENT DOCUMENTS

| | | | | |
|---|---|---|---|---|
| 5,559,920 | A | 9/1996 | Chraplyvy et al. | 385/123 |
| 5,717,510 | A | 2/1998 | Ishikawa et al. | 398/199 |
| 5,877,879 | A | 3/1999 | Naito | 398/91 |
| 5,877,881 | A | 3/1999 | Miyauchi et al. | 398/193 |
| 6,263,139 | B1 | 7/2001 | Kawakami et al. | 385/123 |
| 6,404,950 | B1 | 6/2002 | Tsukitani et al. | 385/27 |
| 6,427,043 | B1 | 7/2002 | Naito | 385/123 |
| 6,681,082 | B1 | 1/2004 | Tanaka et al. | 398/158 |
| 6,731,877 | B1 * | 5/2004 | Cao | 398/91 |
| 7,373,040 | B2 * | 5/2008 | Cai et al. | 385/24 |
| 7,539,417 | B2 * | 5/2009 | Okuno | 398/81 |
| 2005/0095007 | A1 | 5/2005 | Odate et al. | 398/159 |
| 2005/0226629 | A1 * | 10/2005 | Ooi et al. | 398/147 |
| 2007/0189775 | A1 * | 8/2007 | Charlet et al. | 398/147 |

OTHER PUBLICATIONS

Fujitsu, "ADVA's 40 G," presentation, 12 pages, Feb. 2005.
"Acterna guide to 40 Gigabit, Challenges, test methods and solutions," ACTERNA, 12 pages, Aug. 2003.
Boduch et al., "Transmission of 40 Gbps Signals through Metropolitan Networks Engineered for 10 Gbps Signals," NTuC1.pdf, 3 pages, 2006.
Ito et al., "Study of 10G/40G Hybrid Ultra Long Haul Transmission Systems with Reconfigurable OADMs for Efficient Wavelength Usage," Ultra Long Haul Transmission 1.1.4, 2 pages, 2002.

(Continued)

*Primary Examiner*—Hanh Phan
(74) *Attorney, Agent, or Firm*—Baker Botts L.L.P.

(57) ABSTRACT

A system and method for dispersion compensation of an optical signal in a hybrid network includes generating optical traffic in a first set of one or more channels, wherein the traffic in the first set of channels is modulated using a first modulation technique. Optical traffic is generated in a second set of one or more channels, wherein the traffic in the second set of channels is modulated using a second modulation technique. An optical dispersion pre-compensation is applied to the second set of channels. The first set of channels and the second set of channels are combined to form an optical signal, and the optical signal is transmitted over an optical network.

21 Claims, 3 Drawing Sheets

OTHER PUBLICATIONS

Mecozzi, et al., "Optical Amplifiers and Their Applications, OSA Trends in Optics and Photonics Series," vol. 44, From the Topical Meeting on Optical Amplifiers and Their Applications, 4 pages, Jul. 9-12, 2000.

Park, et al., "40-Gb/s Transmissions Over Multiple 120-km Spans of Conventional Single-Mode Fiber Using Highly dispersed Pulses," *IEEE*, IEEE Photonics Technology Letters, vol. 12, No. 8, 5 pages, Aug. 2000.

Konrad, et al., "Dispersion Compensation Schemes for 160 Gb/s TDM-Transmission Over SSMF and NZDSF," Technical University Berlin, Germany, *ECOC*, 2 pages, 2001.

Pizzinat, et al., "40-Gb/s Systems on G.652 Fibers: Comparison Between Periodic and All-at-the-End Dispersion Compensation,"*IEEE*, Journal of Lightwave Technology, vol. 20, No. 9, 6 pages, Sep. 2002.

Hansen, "Turning metro visions into value, FSP 3000 -40G features discussion," ADVA Optical Networking, 13 pages, Oct. 26, 2005.

* cited by examiner

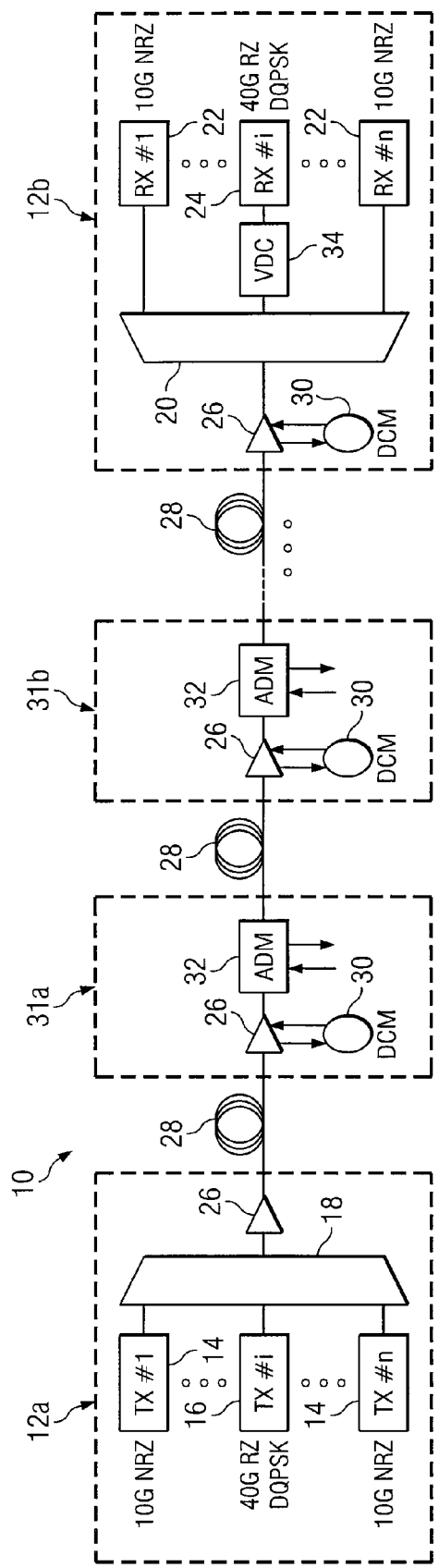
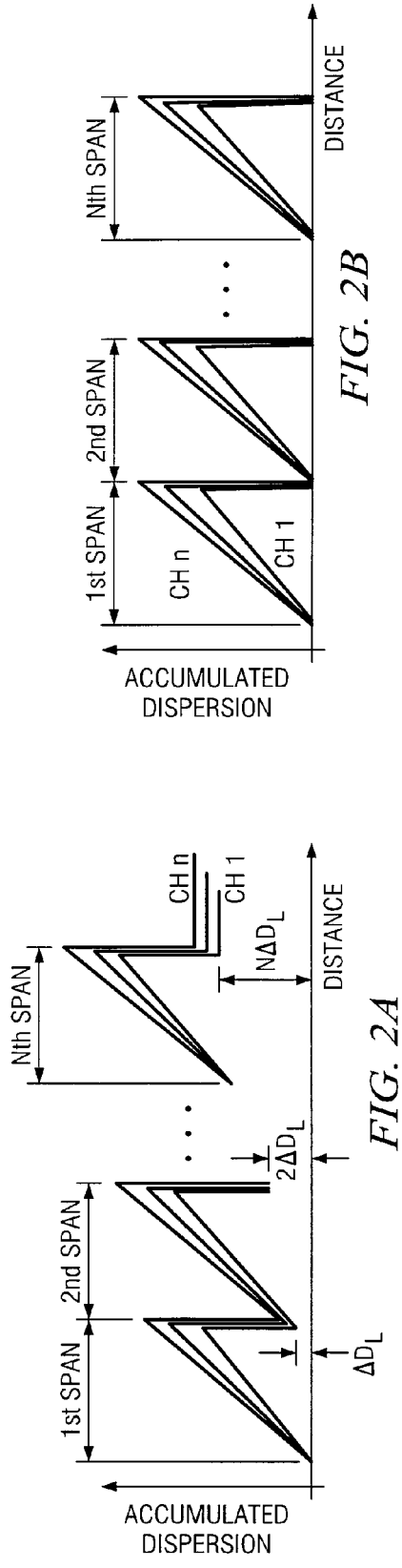
FIG. 1
FIG. 2A
FIG. 2B

METHOD AND SYSTEM FOR COMPENSATING FOR OPTICAL DISPERSION IN AN OPTICAL SIGNAL IN A HYBRID OPTICAL NETWORK

TECHNICAL FIELD OF THE INVENTION

The present invention relates generally to optical networks and, more particularly, to a method and system for compensating for optical dispersion in an optical signal in a hybrid, optical network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, a sometimes undesirable phenomenon that causes the separation of an optical wave into spectral components with different frequencies. Optical dispersion occurs because the different wavelengths propagate at different capacities. The separation of an optical wave into its respective channels due to optical dispersion requires optical dispersion compensation for the particular optical signal.

Optical networks use various transmission capacities and modulation techniques to transmit information. If a single network includes signals of different transmission capacities and modulation techniques, an optical dispersion technique designed for a specific transmission capacity and modulation technique may not provide appropriate compensation for the other transmission capacity and modulation technique in the network.

SUMMARY

In accordance with the present invention, disadvantages and problems associated with previous techniques for optical dispersion in hybrid, optical networks may be reduced or eliminated.

According to one embodiment of the present invention, a system and method for dispersion compensation of an optical signal in a hybrid network includes generating optical traffic in a first set of one or more channels, wherein the traffic in the first set of channels is modulated using a first modulation technique. Optical traffic is generated in a second set of one or more channels, wherein the traffic in the second set of channels is modulated using a second modulation technique. An optical dispersion pre-compensation is applied to the second set of channels. The first set of channels and the second set of channels are combined to form an optical signal, and the optical signal is transmitted over an optical network.

Technical advantages of one or more embodiments of the present invention may include performing optical dispersion compensation on optical signals comprised of a plurality of channels carrying data modulated using different modulation techniques or different bit rates. For example, one or more embodiments of the present invention may perform optical dispersion compensation for a WDM signal comprised of ten-gigabit-per-second, non-return-to-zero channels and forty-gigabit-per-second, return-to-zero differential-quadrature-phase-shift-keying channels. Thus, the performance of both sets of channels will be optimal, near-optimal, or adequate after the optical dispersion compensation. Other technical advantages of one or more embodiments include reducing the inter-channel effects in a signal, such as cross-phase modulation (XPM).

Embodiments of the present invention may also allow for an economically efficient system and method for performing optical dispersion compensation on optical signals comprised of channels with different modulation techniques. One or more of the embodiments of the present invention may include system components currently in use in optical networks or allow for economically efficient upgrades of or additions to currently used components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of an optical network carrying a signal comprising a plurality of sets of channels using at least two different modulation techniques;

FIGS. 2A and 2B are graphs illustrating the difference in optimum optical dispersion compensation for the sets of channels of FIG. 1;

DETAILED DESCRIPTION

Figure 3:
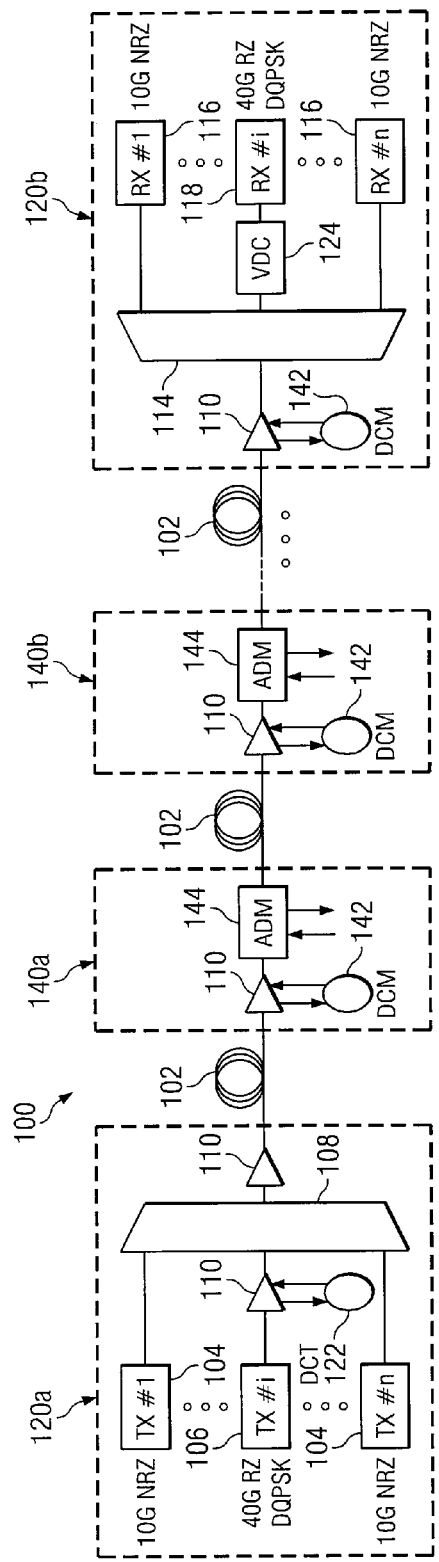
FIG. 3 is a block diagram illustrating one embodiment of an optical network comprising sets of channels using at least two different modulation techniques that provide optimal or adequate optical dispersion compensation for each set of channels.

FIG. 1 illustrates an example optical network 10. The optical network 10 includes one or more optical fibers 28 operable to transport one or more optical signals communicated by components of optical network 10. The components of optical network 10, coupled together by the optical fibers 28, include terminal nodes 12a and 12b and one or more optical add/drop multiplexers (OADM) 31 (for example, OADMs 31a and 31b). Although the optical network 10 is shown as a point-to-point optical network with terminal nodes, the optical network 10 may also be configured as a ring optical network, a mesh optical network, or any other suitable optical network or combination of optical networks. The optical network 10 may be used in a short-haul metropolitan network, a long-haul inter-city network, or any other suitable network or combination of networks. Optical fibers 28 represent any suitable type of fiber, such as a Single-Mode Fiber (SMF), Enhanced Large Effective Area Fiber (E-LEAF), or True-Wave® Reduced Slope (TW-RS) fiber.

Terminal node 12a includes transmitters 14 and 16, a multiplexer 18, and an amplifier 26. Transmitters 14 and 16 include any transmitter or other suitable device operable to transmit optical signals. Each transmitter 14 or 16 is operable to receive information and to modulate one or more wavelengths of light to encode the information on the wavelength. In optical networking, a wavelength of light is also referred to as a channel. Each transmitter 14 or 16 is also operable to transmit this optically encoded information on the associated wavelength. The multiplexer 18 includes any multiplexer or combination of multiplexers or other devices operable to combine different channels into one signal. For example, multiplexer 18 may be a wavelength selective switch (WSS). Multiplexer 18 is operable to receive and combine the disparate channels transmitted by transmitters 14 and 16 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy is applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, the terminal node 12a in optical network 10 is operable to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (GB/s) and modulate the information using, for example, a non-return-to-zero (NRZ) modulation technique. Signal transmission upgrades include, for example, transmitting information at forty GB/s using return-to-zero differential quadrature phase shift keying (RZ-DQPSK) to modulate the optical signal. Since upgrading the entire optical network's transmitters would be cost-prohibitive for most optical network operators, many such operators have instead desired to upgrade their networks by incrementally replacing existing ten GB/s NRZ transmitters with forty GB/s RZ-DQPSK transmitters (these types of transmitters being used only as examples).

One challenge faced by those wishing to implement the cost-efficient strategy of integrating upgraded transmitters with existing transmitters is the challenge of optical dispersion compensation. Even in existing WDM and DWDM networks, optical signals comprised of disparate wavelengths experience optical dispersion. Optical dispersion refers to the separation of an optical signal into its spectral components with different frequencies. Optical dispersion occurs because the differing wavelengths propagate at differing capacities. As optical signals travel across existing optical networks and experience optical dispersion, they may receive "optimal" optical dispersion compensation that achieves optimal or near-optimal performance. As used herein, "optimal" optical dispersion compensation refers to the optimum or near-optimum optical dispersion compensation for a particular modulation technique. Specially designed dispersion compensation fibers have been developed to compensate for dispersion in an optical signal comprised of channels modulated using the same modulation technique.

Systems that employ both upgraded transmitters and existing transmitters need to perform optical dispersion compensation on channels that use different modulation techniques. The challenge that arises is that complete optical dispersion compensation for channels using different modulation techniques may be different. For example, this is in fact the case with channels modulated using NRZ modulation and channels modulated using RZ-DQPSK modulation, as illustrated in FIGS. 2A and 2B, respectively.

The graphs in FIGS. 2A and 2B illustrate the difference in optimum optical dispersion compensation for two different WDM optical signals, a ten GB/s NRZ signal and a forty GB/s RZ-DQPSK signal. The vertical axis of the graphs represents accumulated optical dispersion. The horizontal axis of the graphs represents the distance that the optical signal has traveled (the number of optical fiber spans over which the signal has traveled). $\Delta D_L$ refers to the residual optical dispersion that a signal should exhibit after each span for optimum performance.

FIG. 2A illustrates an optical dispersion map for a signal comprising a set of ten GB/s NRZ channels that would optimize performance for that signal. As illustrated in FIG. 2A, the ten GB/s NRZ channels have optimum performance when they are undercompensated. In other words, performing optical dispersion compensation in the optical signal after each span so that the optical signal exhibits a positive $\Delta D_L$ per span leads to optimal performance for the ten GB/s NRZ channels.

FIG. 2B illustrates an optical dispersion map for a signal comprising a set of forty GB/s RZ-DQPSK channels that would optimize performance for that signal. As illustrated in FIG. 2B, a signal comprising a set of forty GB/s RZ-DQPSK channels has optimum performance when the channels undergo 100% compensation. In other words, performing optical dispersion compensation on the optical signal after each span so that the optical signal exhibits a zero $\Delta D_L$ per span leads to optimal performance for the forty GB/s RZ-DQPSK channels.

As illustrated in FIGS. 2A and 2B, optimal optical dispersion compensation is different for channels using an NRZ modulation format than for channels using a RZ-DQPSK modulation format. It should be noted again that "optimal" optical dispersion compensation refers to the optimum or near-optimum optical dispersion compensation for a particular modulation technique. In existing networks, optical dispersion compensation devices perform optimal optical dispersion compensation on signals using one modulation format, such as the NRZ format. If upgraded transmitters using a different modulation format, such as the RZ-DQPSK format, are incorporated into the network alongside existing NRZ transmitters, the existing optical dispersion compensation devices will not perform optimal optical dispersion compensation for the upgraded optical signals.

For example, existing optical dispersion compensation devices in a previously all-NRZ network will perform optimal optical dispersion compensation for NRZ channels and non-optimal optical dispersion compensation for RZ-DQPSK channels. Running the signal through another optical dispersion compensation device would then produce optimal optical dispersion compensation for the RZ-DQPSK channels (if residual optical dispersion is close to zero) but would overcompensate for optical dispersion in the already-compensated NRZ signal. Embodiments of the present invention, discussed below, address the challenge of providing optimal and/or adequate optical dispersion compensation in signals carrying channels using different modulation formats.

Referring back to the example embodiment in FIG. 1, the WDM signal generated by node 12a includes sets of channels using different modulation formats. In particular, the WDM signal comprises a set of channels communicating information at ten GB/s using NRZ modulation and a set of channels communicating information at forty GB/s using RZ-DQPSK modulation; however, the sets of disparate channels may communicate information at any suitable bit rate and/or using any suitable modulation technique. For example, one or more of the channels may communicate information at a rate of ten, twenty, forty, eighty, over eighty GB/s, or any other suitable bit rate. One or more of the channels may additionally communicate information using a modulation technique such as RZ, carrier suppressed return-to-zero (CS-RZ), NRZ, differential phase shift keying (DPSK), DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel signal is transmitted from terminal node 12a, the signal travels over optical fibers 28 to OADMs 31. The optical fibers 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions in optical network 10.

OADMs 31 include an amplifier 26 and associated optical dispersion compensating module 30 (DCM), as well as an add/drop module 32 (ADM). As discussed above, amplifiers 26 may be used to amplify the WDM signal as it travels through the optical network 10. DCMs 30 include any dispersion compensating fiber (DCF) or other dispersion compensating device operable to perform optical dispersion compensation on a signal or set of channels comprising a signal that use one modulation technique. For a signal comprising channels using different modulation techniques such as NRZ and DQPSK, DCMs 30 may be operable to perform optimal optical dispersion compensation on one set of channels using one modulation technique and non-optimal optical dispersion compensation on another set of channels using another modulation technique.

As described above and referring to FIGS. 2A and 2B, DCMs 30 produce different results for differently-modulated channels because the NRZ- and RZ-DQPSK-modulated channels perform optimally with different levels of residual optical dispersion. NRZ-modulated channels perform optimally with some residual dispersion, and RZ-DQPSK-modulated channels perform optimally with no residual dispersion. In the example embodiment of FIG. 1, the DCMs 30 are operable to perform optimal dispersion compensation on the ten GB/s NRZ channels and non-optimal dispersion compensation on the forty GB/s RZ-DQPSK channels. Although the optical network 10 shows the DCMs 30 coupled to respective amplifiers 26, the DCMs 30 may also be positioned separately from the amplifiers 26.

ADMs 32 may include any device or combination of devices operable to add and/or drop optical signals from fibers 28. ADMs 32 may also include any device or combination of devices operable to optimally compensate for optical dispersion in one or more sets of channels in an optical signal for which dispersion compensation was not completed by the associated DCM 30.

After a signal passes through OADM 31, the signal may travel along fibers 28 directly to terminal node 12b, or the signal may be passed through one or more additional OADMs 31 (such as OADM 31b, for example) before reaching terminal node 12b. Terminal node 12b is operable to receive signals transmitted over optical network 10. Terminal node 12b includes an amplifier 26 and an associated DCM 30, a demultiplexer 20, and receivers 22 and 24. As described above, amplifier 26 may be used to amplify the WDM signal as it travels through optical network 10, and DCM 30 may perform optimal optical dispersion compensation on a set of channels comprising a signal that use one modulation technique. Again, although the optical network 10 shows DCM 30 coupled to a respective amplifier 26, the DCM 30 may also be positioned separately from amplifier 26. Terminal node 12b also includes a Variable Dispersion Compensator (VDC) 34 to compensate any dispersion remaining in the demultiplexed forty GB/s RZ-DQPSK signals before receiver 24 receives the signals. VDC 34 may comprise any device operable to compensate for optical dispersion and adjust to environmental variables, such as temperature. Although a VDC is described, any other suitable compensation device may be used (such as a DCF).

Demultiplexer 20 includes any demultiplexer or other device operable to separate the disparate channels multiplexed using WDM, DWDM, or other suitable multi-channel multiplexing technique. For example, demultiplexer 20 may include a WSS or an arrayed waveguide grating (AWG). Demultiplexer 20 is operable to receive an optical signal carrying a plurality of multiplexed channels, demultiplex the disparate channels in the optical signal, and pass the disparate channels to different receivers 22 and 24.

Receivers 22 and 24 include any receiver or other suitable device operable to receive an optical signal. Each receiver 22 or 24 is operable to receive a channel of an optical signal carrying encoded information and demodulate the information into an electrical signal. These channels received by receivers 22 or 24 may include the channels transmitted by transmitters 14 and 16 and/or channels added by ADMs 32.

As noted above, DCM 30 optimally compensates only a set of channels comprising a signal that use one modulation technique. In example optical network 10, DCM 30 at terminal node 12b optimally compensates only for the set of ten GB/s NRZ channels.

In operation, transmitters 14 and 16 of terminal node 12a transmit information at different bit rates and/or using different modulation techniques over different channels. The multiplexer 18 combines these different channels into an optical signal and communicates the signal over optical fiber 28. An amplifier 26 receives the optical signal, amplifies the signal, and passes the signal over optical fiber 28. Optical fiber 28 transports the signal to an OADM 31a. Amplifier 26 of OADM 31a receives the signal, amplifies the signal, and passes the signal to the DCM 30 of OADM 31a. Again, amplifier 26 of OADM 31a may be positioned separately from, either before or after, the DCM 30.

The DCM 30 of OADM 31a receives the signal and performs optical dispersion compensation on the signal. As described above, the DCM 30 cannot compensate both sets of differently-modulated channels optimally. In the example embodiment of FIG. 1, the DCM 30 performs optimal dispersion compensation on the ten GB/s NRZ channels and non-optimal dispersion compensation on the forty GB/s RZ-DQPSK channels, and forwards the optical signal. Optimal dispersion compensation for the NRZ channels correlates to the results shown in FIG. 2A for optimum dispersion compensation in the ten GB/s NRZ channels.

After the DCM 30 performs optical dispersion compensation on the signal and forwards the signal, the ADM 32 of OADM 31a receives the signal. After receiving the optical signal, the ADM 32 may drop channels from the optical signal and/or add channels to the optical signal. The ADM 32 then forwards a signal comprising one or more of the compensated NRZ or RZ-DQPSK channels and one or more of the added channels (if channels are added by the ADM 32). There may be one or more OADMs 31 in example optical network 10.

After the signal passes through the one or more OADMs 31 (such as, for example, OADMs 31a and 31b), DCM 30 of terminal node 12b receives the forwarded signal and performs optical dispersion compensation on the signal. As described above, the DCM 30 cannot compensate both sets of differently-modulated channels optimally. In the example embodiment of FIG. 1, the DCM 30 performs optimal dispersion compensation on the ten GB/s NRZ channels and non-optimal dispersion compensation on the forty GB/s DPSK or DQPSK channels, and forwards the optical signal.

The demultiplexer 20 of terminal node 12b receives the signal, demultiplexes the signal into the signal's constituent channels, and passes the signal's constituent channels. Each channel is received by an associated receiver 22 or 24 of terminal node 12b and forwarded. However, because compensation is not optimal for the forty GB/s DQPSK channels, errors may be generated when receiving such channels.

As noted above, although the optical network 10 is shown as a point-to-point optical network with terminal nodes, the optical network 10 may also be configured as a ring optical network, a mesh optical network, or any other suitable optical network or combination of optical networks.

FIG. 3 is a block diagram illustrating one embodiment of an optical network 100 comprising sets of channels using at least two different modulation techniques that provides optimal and/or "adequate" optical dispersion compensation for each set of channels. As used herein, "adequate" optical dispersion compensation refers to the sufficient optical dispersion compensation for a particular modulation technique. The adequate optical dispersion compensation provides for reduced signal degradation, but may not be optimal optical dispersion compensation. Therefore, some amount of residual dispersion may remain after the application of the dispersion compensation map. The amount of residual dispersion may decrease over a distance to a minimal amount of residual dispersion.

Example optical network 100 of FIG. 3 addresses the challenge, as discussed above, to compensate optimally and/or adequately for optical dispersion in a signal comprising channels using different modulation techniques. Again, this challenge has arisen due to the desire of optical network operators to upgrade their networks incrementally to increase network capacity. Specifically, these operators have sought to increase network capacity through the cost-efficient strategy of integrating upgraded transmitters with existing transmitters. This strategy has created a need for solutions to the challenge of adequately compensating for optical dispersion in signals comprising differently-modulated channels, the difference in modulation due to the different types of transmitters modulating signals differently.

Example network 100 of FIG. 3 offers a technique that provides optimal and/or adequate optical dispersion compensation for each differently-modulated channel. Example network 100 applies an amount of optical dispersion compensation ("pre-compensation") to the forty GB/s RZ-DQPSK channel(s) before the forty GB/s RZ-DQPSK channel(s) is combined with the ten GB/s NRZ channel(s). In a particular embodiment, the amount of pre-compensation is approximately negative two hundred and eighty picoseconds per nanometer for six spans of SMF having an amount of accumulated dispersion per span of 1700. The amount of pre-compensation may be same or different to provide optimum pre-compensation for other networks 100 that have different fibers 102 or other environmental differences that may influence the pre-compensation. For example, a TW-RS fiber may have a different accumulated dispersion per span and a different amount of pre-compensation may be applied to account for the change in fiber.

The network configuration for ten GB/s NRZ channels that implements the dispersion map as shown in FIG. 2A is then applied to the pre-compensated forty GB/s RZ-DQPSK channel(s) and the ten GB/s NRZ channel(s) to provide optimal optical dispersion compensation for the ten GB/s NRZ channel(s) and to provide adequate and optimal optical dispersion compensation for the forty GB/s RZ-DQPSK channel(s), through the use of DCMs for ten GB/s NRZ channels. For example, the forty GB/s RZ-DQPSK channel(s) may have been optimized to have optimal optical dispersion compensation after traveling six hundred kilometers. The dispersion compensation of the forty GB/s RZ-DQPSK channel(s) is adequate before and after the optimized distance because of the application of pre-compensation. VDC 124 is applied to the forty GB/s RZ-DQPSK channel(s) at terminal node 120b to handle any minimal residual dispersion in the forty GB/s RZ-DQPSK channel(s). The pre-compensation applied to the forty GB/s RZ-DQPSK channel(s) allows for a configuration of network components that implements an existing optical dispersion map, in this case the ten GB/s NRZ channel dispersion map, to be used for signals having different modulation formats. The application of the pre-compensation allows for the transmission of signals over a network configuration that implements a dispersion map that is not optimized for such signals. For example, the use of this pre-compensation may lead to broadening of the pulse, which results in the reduction of SPM/GVD-induced signal degradation and allows signals for which the dispersion map is not optimal to be transmitted using the network configuration that implements that map.

Like example network 10, example optical network 100 is operable to carry a signal comprising a plurality of channels using at least two different modulation formats. The optical network 100 also includes one or more optical fibers 102 operable to transport one or more optical signals communicated by components of the optical network 100. The components of optical network 100, coupled together by the optical fibers 102, include terminal nodes 120a and 120b and one or more OADMs 140. Terminal node 120a is substantially similar to terminal node 12a, but also includes an amplifier 110 and an associated Dispersion Compensation Module at the Transmitter (DCT) 122 on the forty GB/s RZ-DQPSK channel (although only a single forty GB/s RZ-DQPSK channel is shown, it should be understood that any suitable number of forty GB/s RZ-DQPSK channels may be implemented). DCT 122 includes any fiber, DCF, or other dispersion compensating device operable to perform optical dispersion compensation on a forty GB/s RZ-DQPSK channel. DCT 122 applies an amount of pre-compensation to the forty GB/s RZ-DQPSK channel before the channel is combined with ten GB/s NRZ channels into an optical signal, and the network configuration that implements the ten GB/s NRZ channel dispersion map is applied to the optical signal. Applying amplifier 110 and DCT 122 to the forty GB/s RZ-DQPSK channel before modulation provides for use of the existing network configuration that implements the ten GB/s NRZ channel optical dispersion map in the rest of the network by providing optimal and/or adequate optical compensation for each of the differently-modulated channels, as described below with respect to FIG. 4.

Fibers 102, transmitters 104 and 106, multiplexer 108, and amplifiers 110 may be the same as fibers 28, transmitters 14 and 16, multiplexer 18, and amplifiers 26, respectively, described above in conjunction with FIG. 1 and thus will not be described again. Although the optical network 100 is shown as a point-to-point optical network with terminal nodes, the optical network 100 may also be configured as a ring optical network, a mesh optical network, or any other suitable optical network or combination of optical networks. The optical network 100 may be used in a short-haul metropolitan network, a long-haul inter-city network, or any other suitable network or combination of networks.

OADMs 140 of example network 100 include an amplifier 110 and an associated DCM 142, as well as an ADM 144. OADMs 140 and DCM 142 may be the same as OADMs 31 and DCM 30, respectively, described above in conjunction with FIG. 1 and thus will not be described again. DCMs 142 are optimized for ten GB/s NRZ channels and are included in the network configuration that implements the ten GB/s NRZ channel dispersion map. Although the example network 100 illustrates the DCMs 142 coupled to respective amplifiers 110, the DCMs 142 may also be positioned separately from amplifiers 110.

ADMs 144 include any device or combination of devices operable to add and/or drop optical signals from fiber 102. ADM 144 devices may include, for example, the device illustrated in FIG. 4 below.

Terminal node 120b of example network 100 is operable to receive signals transmitted over optical network 100 and compensate those signals for optical dispersion. Demultiplexer 114 and receivers 116 and 118 may be the same as demultiplexer 20 and receivers 22 and 24, respectively, described above in conjunction with FIG. 1 and thus will not be described again. Terminal node 120b also includes a VDC 124 to optimally compensate any minimal dispersion remaining in the demultiplexed forty GB/s RZ-DQPSK signals before receiver 118 receives the signals. VDC 124 may comprise any device operable to compensate for optical dispersion and adjust to environmental variables, such as temperature. Although a VDC is described, any other suitable compensation device may be used (such as a DCF).

Modifications, additions, or omissions may be made to the network 100 described without departing from the scope of the invention. The components of network 100 may be integrated or separated according to particular needs. Moreover, the operations of network 100 may be performed by more, fewer, or other components.

Figure 4A:
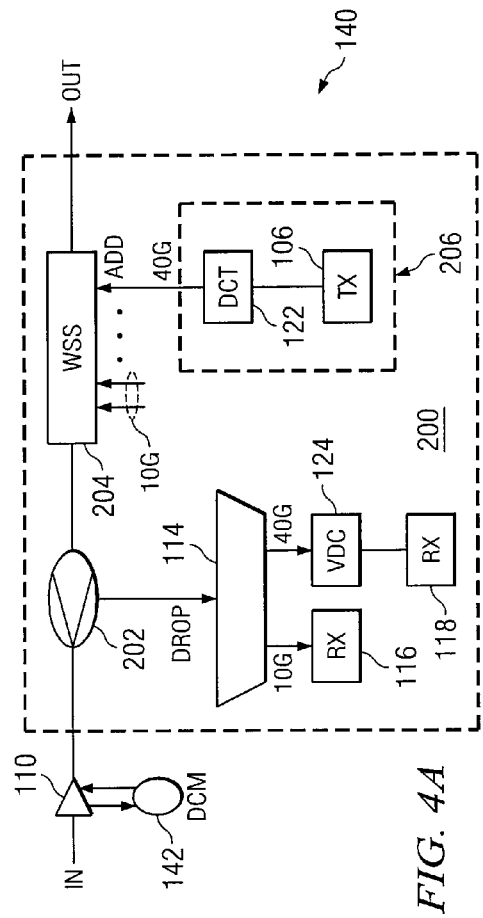
FIG. 4A is a block diagram illustrating an optical add/drop multiplexer of the network of FIG. 3 that compensates for optical dispersion according to a particular embodiment of the present invention.

FIG. 4A is a block diagram illustrating an example OADM 140 of network 100 of FIG. 3 that compensates for optical dispersion according to a particular embodiment of the present invention. OADM 140 includes an amplifier 110 and an associated DCM 142, as illustrated in FIG. 3, along with an ADM 200, which is one example of ADM 144 illustrated in FIG. 3.

ADM 200 is operable to receive an optical signal on the optical network 10, and, as described below, facilitates optimal optical dispersion compensation in the set of channels by DCM 142. ADM 200 may include a coupler 202, a WSS 204, and a transponder 206.

Coupler 202 represents any suitable optical component operable to split an optical signal into two copies of the optical signal. Coupler 202 may comprise an optical fiber coupler or other optical component operable to split an optical signal.

WSS 204 may comprise any WSS or other suitable device operable to receive multiple optical signals, demultiplex each signal into the signal's constituent channels, multiplex the remaining channels and any added channels, and pass the multiplexed signal along the optical network 100.

Transponder 206 represents any suitable optical component operable to transmit and receive optical signals. In the illustrated embodiment, transponder 206 includes components that handle the transmission of a forty GB/s RZ-DQPSK channel to be added to the optical signal. Transponder 206 includes transmitter 106 and DCT 122. As described above with respect to FIG. 3, DCT 122 applies an amount of pre-compensation to the forty GB/s RZ-DQPSK channel before modulation. The application of the pre-compensation provides for use of an existing network configuration that implements an existing dispersion compensation map; in this example, the network configuration that implements the ten GB/s NRZ channel dispersion map; for the forty GB/s RZ-DQPSK channel.

Figure 4B:
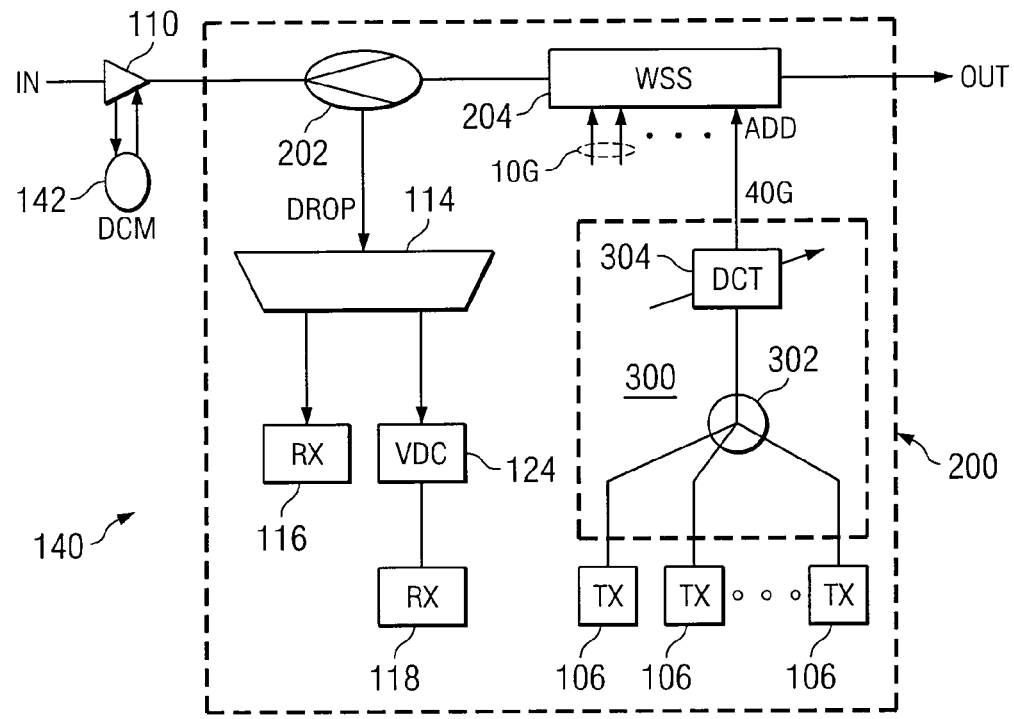
FIG. 4B is a block diagram illustrating an exemplary embodiment of a dispersion compensation card.

Transponder 206 may be configured in any suitable manner to apply the pre-compensation to the forty GB/s RZ-DQPSK channel. For example, transmitter 106 and DCT 122 may be on separate cards and may not be coupled on a single transponder card. Furthermore, if multiple forty GB/s RZ-DQPSK channels are to be added, there may be multiple transponders 206. Alternatively, as illustrated in FIG. 4B, multiple forty GB/s RZ-DQPSK channel transmitters 106 may share a single DCT 122.

Demultiplexer 114, receivers 116 and 118, and VDC 124 are described in conjunction with FIG. 3 above and thus will not be described again. Demultiplexer 114 and receives a signal to be dropped at OADM 140. Receivers 116 and 118 receive constituent channels of the signal following separation by demultiplexer 114.

In operation, amplifier 110 receives an optical signal communicated on optical network 100, amplifies the optical signal, and forwards the optical signal to DCM 142. As described above, the optical signal includes one or more ten GB/s NRZ channels and one or more forty GB/s RZ-DQPSK channels. DCM 30 receives the optical signal and performs optical dispersion compensation on the signal. In the example embodiment, as described above, DCM 30 performs optimal dispersion compensation on the ten GB/s NRZ channels and adequate dispersion compensation on the forty GB/s RZ-DQPSK channels (i.e. leaving some amount of residual dispersion on both channels) based on the network configuration that implements the ten GB/s NRZ dispersion compensation map. Because of the pre-compensation applied to the forty GB/s RZ-DQPSK channels, these channels are adequately compensated.

In ADM 200, coupler 202 receives the optical signal from DCM 142, splits the optical signal into two copies, passes the first copy to WSS 204, and drops the second copy to demultiplexer 114. WSS 204 receives the first copy of the signal, combines the signal with added channels, as described below, and passes the multiplexed signal onto optical network 100. Demultiplexer 114 receives the second copy of the signal and separates the channels of the second copy. Each channel may be dropped to an associated receiver for communication to one or more client devices of ADM 200 (or to other suitable destinations) or may be terminated. In the illustrated embodiment, the ten GB/s NRZ channel is dropped to receiver 116, and the forty GB/s RZ-DQPSK channel is dropped to VDC 124 to compensate for any minimal remaining dispersion and then to receiver 118.

Channels may be added to the optical signal at ADM 200. In the illustrated embodiment, ten GB/s NRZ channels and forty GB/s RZ-DQPSK channel are transmitted to WSS 204 and added to the optical signal for transmission on optical network 100. WSS 204 receives the forty GB/s RZ-DQPSK channel from transponder 206. DCT 122 applies an amount of pre-compensation to the forty GB/s RZ-DQPSK channel before transmission to WSS 204.

WSS 204 receives the ten GB/s NRZ channels and the forty GB/s RZ-DQPSK channel and combines the channels with the first copy of the optical signal received from coupler 202. WSS 204 passes the new optical signal along optical network 100.

FIG. 4B is a block diagram illustrating an exemplary embodiment of a DCT card 300. The illustrated embodiment includes a 1×N coupler 302 coupled to a variable DCT 304. In this embodiment, N forty GB/s RZ-DQPSK channel transmitters 106 feed into the 1×N coupler 302, and the coupler feeds into the variable DCT 304. In other embodiments, the coupler 302 may be replaced by a multiplexer, a cascade of thin-film filters, or any other suitable component for combining the multiple forty GB/s RZ-DQPSK channels. In particular embodiments, coupler 302 and DCT 304, or other suitable device, may be located on one card in the OADM 140 and transmitters 106 may be located on separate cards that are coupled to the DCT card 300 via a backplane of OADM 140. In the above-discussed card configurations, a single port on WSS 204 may be used for the DCT card 300 and may handle all forty GB/s RZ-DQPSK channels. As another example, multiple DCT cards 300 may each support a sub-group of the forty GB/s RZ-DQPSK channels. In this example, each DCT card 300 may be coupled to a different WSS port, and each port may handle one sub-group of forty GB/s RZ-DQPSK channels. The operation of OADM 140 in FIG. 4B may be substantially similar to the operation as described above with respect to FIG. 4A.

Modifications, additions, or omissions may be made to OADM 140 as illustrated in FIGS. 4A and 4B. For example, ADM 200 may include an amplifier 110 after WSS 204 to amplify the new optical signal before transmission along optical network 100. Furthermore, although a drop coupler 202 and an add WSS 204 are described, one skilled in the art will understand that various other components may be used to drop traffic to receivers 116 and to add traffic from transmitter (s) 106. As discussed above, ADM 200 may also have various configurations with DCT cards and transmitters. The components of OADM 140 may be integrated or separated according to particular needs. Moreover, the operations of OADM 140 may be performed by more, fewer, or other components. Additionally, although OADM 140 as described compensates for dispersion in sets of ten GB/s NRZ channels and forty GB/s RZ-DQPSK channels, the sets of channels may have different bit rates or modulation formats than those described, including the ones listed above in discussing FIG. 1.

Figure 5:
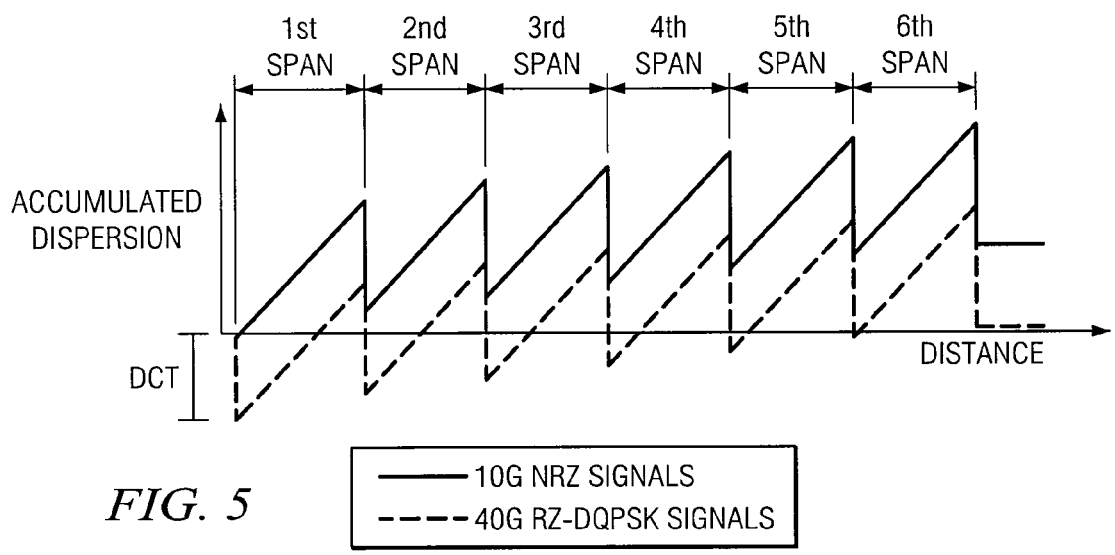
FIG. 5 is a graph illustrating optical dispersion compensation for signals in the optical network of FIG. 3.

FIG. 5 is a graph illustrating optical dispersion compensation for signals in optical network 100 of FIG. 3. The vertical axis represents accumulated optical dispersion. The horizontal axis represents the distance that the optical signal has traveled (the number of optical fiber spans over which the signal has traveled). In the illustrated embodiment, each span represents a distance of 100 kilometers. Specifically, the graph illustrates the optical dispersion map for a signal comprising of set of ten GB/s NRZ channels and a signal comprising a set of forty GB/s RZ-DQPSK channels. The forty GB/s RZ-DQPSK channels are pre-compensated before transmitting the channels through a network configuration that implements a ten GB/s NRZ optical dispersion map. Network components that implement the ten GB/s NRZ dispersion map are then applied to each of the signals by transmitting the signals through a network optimized for ten GB/s NRZ channels.

The application to the ten GB/s NRZ channels of the network configuration that produces a ten GB/s NRZ channel dispersion map produces a dispersion similar to that discussed with respect to FIG. 2A. As discussed above, the ten GB/s NRZ channels have optimum performance when they are undercompensated. In other words, performing optical dispersion compensation in the optical signal after each span so that the optical signal exhibits a positive $\Delta D_L$ per span leads to optimal performance for the ten GB/s NRZ channels.

As discussed with respect to FIG. 2B, the forty GB/s RZ-DQPSK signal has optimum performance when the channels exhibit a zero $\Delta D_L$ per span, which reduces signal degradation due to self-phase modulation (SPM)/group-velocity dispersion (GVD), which is the phase noise due to the overlap of neighboring pulses. However, the forty GB/s RZ-DQPSK signal is more tolerant to a network configuration that implements a non-optimum dispersion map than the ten GB/s NRZ signal. Therefore, the performance for a combination of ten GB/s NRZ signals and forty GB/s RZ-DQPSK signals is optimized when a network configuration that produces a ten GB/s NRZ channel dispersion map is applied to both signals and the forty GB/s RZ-DQPSK signal is pre-compensated to handle the application of the ten GB/s NRZ dispersion map network configuration.

When the pre-compensation is applied to the forty GB/s RZ-DQPSK channels, the accumulated dispersion of the channel is a negative value. The forty GB/s RZ-DQPSK channels may travel a distance during which the accumulated dispersion becomes negative. Applying the pre-compensation to the forty GB/s RZ-DQPSK channel reduces signal degradation due to self-phase modulation (SPM)/group-velocity dispersion (GVD), which is the phase noise due to the overlap of neighboring pulses. Over a particular distance, the forty GB/s RZ-DQPSK signal experiences optimal optical dispersion compensation due to the combination of the pre-compensation and the residual dispersion of the ten GB/s dispersion map. The dispersion compensation is adequate before the optimized distance because of the pre-compensation. The application of pre-compensation leads to broadening of the pulse and less pulse overlap, which results in the reduction of SPM/GVD-induced signal degradation. In a particular embodiment, the pre-compensation applied at DCT 122 is approximately negative two hundred and eighty picoseconds per nanometer for a transmission over six spans of SMF having an amount of accumulated dispersion per span of 1700. A range of pre-compensation may be negative two hundred picoseconds per nanometer to negative four hundred picoseconds per nanometer. As discussed above, the amount of pre-compensation may be same or different to provide optimum pre-compensation for other networks 100 that have different fibers 102 or other environmental differences that may influence the pre-compensation.

Although the present invention has been described with several embodiments, various changes and modifications may be suggested to one skilled in the art. It is intended that the present invention encompass such changes and modifications as fall within the scope of the appended claims.

What is claimed is:

1. A method for dispersion compensation of an optical signal in a hybrid network, comprising:
   generating optical traffic in a first set of one or more channels, wherein the traffic in the first set of channels is modulated using a first modulation technique;
   generating optical traffic in a second set of one or more channels, wherein the traffic in the second set of channels is modulated using a second modulation technique;
   applying an optical dispersion pre-compensation to the second set of channels;
   combining the first set of channels and the second set of channels to form an optical signal; and
   transmitting the optical signal over an optical network that is configured to compensate for optical dispersion in the optical traffic modulated using the first modulation technique and not the second modulation technique and that is configured to leave a residual optical dispersion after each span of the network.

2. The method of claim 1, wherein:
   the optical traffic in the first set of channels is communicated at ten Gigabytes per second (GB/s); and
   the optical traffic in the second set of channels is communicated at forty GB/s.

3. The method of claim 1, wherein:
   the first modulation technique is a non-return-to-zero (NRZ) modulation technique; and
   the second modulation technique is a return-to-zero differential quadrature phase shift keying modulation technique (RZ-DQPSK).

4. The method of claim 1, wherein the optical network is configured to:
   compensate for optical dispersion such that dispersion compensation for the first set of channels is optimal after each span; and
   compensating for optical dispersion such that dispersion compensation for the second set of channels is optimal.

5. The method of claim 1, wherein the optical network comprises one or more dispersion compensation devices operable to compensate for a portion of the dispersion and leave a residual dispersion.

6. The method of claim 1, wherein the optical dispersion pre-compensation is approximately negative two hundred and eighty picoseconds per nanometer.

7. The method of claim 1, wherein the optical dispersion pre-compensation is between negative two hundred picoseconds per nanometer and negative four hundred picoseconds per nanometer.

8. The method of claim 1, further comprising:
   receiving traffic in the second set of channels;
   separating the second set of channels into two or more constituent channels;
   determining whether each channel of the two or more constituent channels has a residual dispersion; and
   applying a variable dispersion compensator to each channel of the two or more constituent channels having residual dispersion.

9. An optical node for dispersion compensation of an optical signal in a hybrid network, comprising:
   one or more first transmitters operable to generate optical traffic in a first set of one or more channels, wherein the traffic in the first set of channels is modulated using a first modulation technique;
   one or more second transmitters operable to generate optical traffic in a second set of one or more channels, wherein the traffic in the second set of channels is modulated using a second modulation technique;
   one or more first dispersion compensation modules coupled to the second transmitters operable to apply an optical dispersion pre-compensation to the second set of channels; and
   a wavelength selective switch (WSS) coupled to the one or more first transmitters and the one or more first dispersion compensation modules and operable to:
      combine the first set of channels and the second set of channels to form an optical signal; and
      transmit the optical signal over an optical network, wherein the optical network is configured to compensate for optical dispersion in the optical traffic modulated using the first modulation technique and not the second modulation technique and is configured to leave a residual optical dispersion after each span of the network.

10. The optical node of claim 9, wherein:
   the optical traffic in the first set of channels is communicated at ten Gigabytes per second (GB/s); and
   the optical traffic in the second set of channels is communicated at forty GB/s.

11. The optical node of claim 9, wherein:
   the first modulation technique is a non-return-to-zero (NRZ) modulation technique; and
   the second modulation technique is a return-to-zero differential quadrature phase shift keying modulation technique (RZ-DQPSK).

12. The optical node of claim 9, wherein the optical node comprises a second dispersion compensation module operable to:

compensate for optical dispersion such that dispersion compensation for the first set of channels is optimal after each span; and compensate for optical dispersion such that dispersion compensation for the second set of channels is optimal.

13. The optical node of claim 12, wherein the second dispersion compensation module is further operable to compensate for a portion of the dispersion and leave a residual dispersion.

14. The optical node of claim 9, wherein the optical dispersion pre-compensation is approximately negative two hundred and eighty picoseconds per nanometer.

15. The optical node of claim 9, wherein the optical dispersion pre-compensation is between negative two hundred picoseconds per nanometer and negative four hundred picoseconds per nanometer.

16. The optical node of claim 9, wherein each of the second transmitters is coupled to one of the first dispersion compensation modules.

17. The optical node of claim 9, wherein one first dispersion compensation module is coupled to the second transmitters, a dispersion compensation card comprises the first dispersion compensation module, and the dispersion compensation card is coupled to the WSS.

18. The optical node of claim 17, wherein the one first dispersion compensation module is a tunable dispersion compensation module.

19. The optical node of claim 17, wherein the dispersion compensation card further comprises an optical device operable to combine one or more optical signals.

20. The optical node of claim 19, wherein the optical device is a selected one of a coupler, a multiplexer, and a plurality of thin-film filters coupled in cascade.

21. The optical node of claim 9, further comprising:

a demultiplexer operable to:
  receive traffic in the second set of channels; and
  separate the second set of channels into two or more constituent channels; and
a variable dispersion compensator operable to vary dispersion compensation to each channel of the two or more constituent channels having residual dispersion.

* * * * *